US008762908B1

(12) United States Patent
Chang et al.

(10) Patent No.: US 8,762,908 B1
(45) Date of Patent: Jun. 24, 2014

(54) STATIC TIMING ANALYSIS WITH DESIGN-SPECIFIC ON CHIP VARIATION DE-RATING FACTORS

(75) Inventors: Hongliang Chang, Cupertino, CA (US); Vassilios Gerousis, San Jose, CA (US); Sireesha Molakalapalli, San Jose, CA (US); Sachin Shrivastava, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 12/824,194

(22) Filed: Jun. 27, 2010

Related U.S. Application Data

(60) Provisional application No. 61/267,010, filed on Dec. 4, 2009.

(51) Int. Cl.
  G06F 9/455 (2006.01)
  G06F 17/50 (2006.01)
(52) U.S. Cl.
  USPC ........... 716/108; 716/113; 716/115; 716/134; 703/19
(58) Field of Classification Search
  USPC ..................... 716/108, 113, 115, 134; 703/19
  See application file for complete search history.

(56) References Cited

U.S. PATENT DOCUMENTS

| 7,512,920 | B2 | 3/2009 | Yoshikawa |
| 7,992,114 | B1 | 8/2011 | Adams et al. |
| 2005/0246673 | A1* | 11/2005 | Charlebois et al. ............... 716/6 |
| 2006/0090150 | A1* | 4/2006 | Kucukcakar et al. ............. 716/6 |
| 2008/0178134 | A1* | 7/2008 | Akamine et al. .................. 716/6 |
| 2009/0024974 | A1 | 1/2009 | Yamada |
| 2010/0095259 | A1* | 4/2010 | Tetelbaum ........................ 716/6 |
| 2010/0229137 | A1 | 9/2010 | Liu et al. |
| 2010/0281444 | A1* | 11/2010 | Zejda et al. ....................... 716/6 |
| 2011/0107291 | A1 | 5/2011 | Barwin et al. |

OTHER PUBLICATIONS

PrimeTime Advanced OCV Technology—Easy-to-Adopt, Variation-Aware Timing Analysis for 65-nm and below, by Snopsys, Apr. 2009.*

* cited by examiner

*Primary Examiner* — Nha Nguyen
(74) *Attorney, Agent, or Firm* — Afford Law Group, Inc.; Tobi C. Clinton

(57) ABSTRACT

In one embodiment of the invention, a method of analysis of a circuit design with respect to within-die process variation is disclosed to generate a design-specific on chip variation (DS-OCV) de-rating factor. The method includes executing a static timing analysis (STA) in an on-chip variation mode using a process corner library. Collecting timing information of the top N critical timing paths. Executing a statistical static timing analysis (SSTA) on the N critical timing paths using timing models characterized for SSTA with sensitivities of delays to process variables. Compare the two timing results and deriving DS-OCV de-rating factors for the clock/data paths to be used in a STA OCV timing analysis to correctly account for the effects of process variations. A user may select to specify DS-OCV de-rating factors for paths or groups of paths and achieve an accurate timing analysis report in a reduced amount of run-time.

26 Claims, 6 Drawing Sheets

STATIC TIMING ANALYSIS WITH DESIGN-SPECIFIC ON CHIP VARIATION DE-RATING FACTORS

CROSS REFERENCE TO RELATED APPLICATIONS

This application claims the benefit of U.S. Provisional Application No. 61/267,010; entitled DESIGN-SPECIFIC ON CHIP VARIATION DE-RATING FACTORS FOR STATIC TIMING ANALYSIS OF INTEGRATED CIRCUITS; filed on Dec. $4^{th}$, 2009 by inventors Hongliang Chang et al.

FIELD

The embodiments of the invention relate generally to timing analysis of integrated circuit designs.

BACKGROUND

Semiconductor fabrication and manufacturing technologies continue to advance and allow an increase in the number of integrated circuits on a die and across a wafer. Identical circuits on a wafer or within the same die may have different performance characteristics due to fabrication or manufacturing process variations.

Some of the fabrication or manufacturing process variations can be accounted for by using a corner-based static timing analysis approach. The fabrication processes can be characterized by running test chips, circuits designed to capture the process variations, through process corners. Process corners are typically determined by the fabrication facility in order to maintain an acceptable level of die yield. This allows the fabrication facility a method to control and monitor the fabrication process.

A static timing analysis (STA) tool utilizing the process corner models can determine some of the effects of process variation on the circuits. Each process corner can be analyzed and the impact on circuit performance characterized. However, fabrication technology advances have increased the significance of process variations on circuits such that not all process variations can be accounted for using this approach.

STA tools are typically used in the design of integrated circuits to determine the timing performance thereof. STA tools typically trade off accuracy in the results to reduce the computer run-time necessary to achieve those results. Integrated circuit designers may be familiar in how to use STA tools.

Statistical Static Timing Analyzer (SSTA) tools are a newer timing analysis tool that may be used to analyze an integrated circuit design. A SSTA tool can provide timing performance and better accuracy in the timing results with respect to variations and yield. Instead of being conservative, SSTA tools may provide for more aggressive IC designs with smaller die size, more die per wafer, and lower costs per die. However, integrated circuit designers may be less familiar with SSTA tools. The setup/integration time to implement SSTA tools may be longer, run-time may be longer without computer performance improvements, and the results tend to be more complicated and difficult to analyze.

In order to account for all process variations, the number of simulations would increase dramatically such that run time would increase exponentially. However, not accounting for on chip variation and/or design specific process sensitivity could impact the functionality, integrated circuit size, and performance.

BRIEF SUMMARY

The embodiments of the invention are best summarized by the claims that follow below.

However briefly, a method of analyzing a circuit design to account for design-specific on chip variation (OCV) is disclosed. The method includes performing a static timing analysis (STA) of a subset of paths in the circuit design utilizing process corner models of a process corner library; performing a statistical static timing analysis (SSTA) of the same subset of paths utilizing a process sensitive delay library that is accurate in timing analysis with process variations; and in effect comparing the timing results of the STA and the SSTA of the subset of paths to calculate one or more design specific on-chip variation de-rating factors. The design specific on-chip variation de-rating factor may then be used to perform a more accurate design specific STA of all paths in the circuit design with a static timing analyzer in order to reduce run time of a timing analysis of the overall circuit design.

BRIEF DESCRIPTIONS OF THE DRAWINGS

DETAILED DESCRIPTION

Figure 1A:
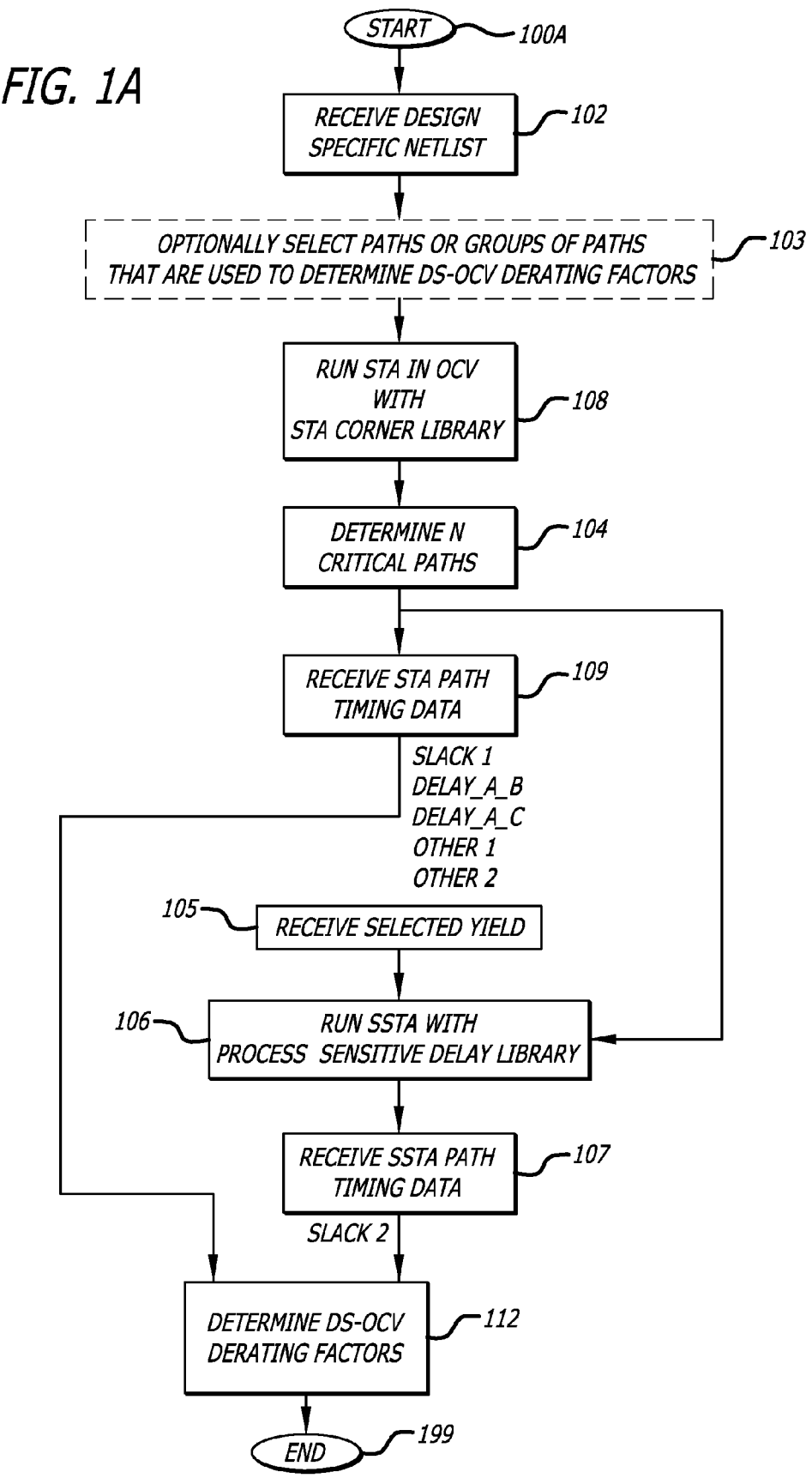
FIG. 1A is a flow chart diagram illustrating a method of calculation of design specific on chip variation (DS-OCV) de-rating factors.

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method and system to statically analyze timing for design-specific on chip variations (DS-OCV).

Variations that Influence Timing

Variations that effect timing characteristics of an integrated circuit can broadly be categorized into two classes, process variations and environmental variations. Process variations result from perturbations in the fabrication process that change the values of parameters such as the effective transistor channel lengths, transistor widths, oxide thicknesses, dopant concentrations, dielectric thicknesses, and interconnect heights and widths. Environmental variations arise due to changes in the operating environment of the circuit, such as the temperature or variations in the power supply voltage levels.

Process variations can be further broadly classified into interdie or die-to-die (D2D) variations and intradie or within-die (WID) variations categories. Generally, interdie or D2D process variations affect all circuit cells on a single integrated circuit chip or die in the same way. Intradie or WID process variations vary from location to location in the same integrated circuit chip or die.

Variations can also be classified as being systematic or random by the sources of these variations. Systematic variations are caused by known sources of physical phenomena and have predictable trends across a chip that can be modeled. Random variations are the variations or random behaviors that are from unknown sources or hard to characterize with a systematic model, and are always characterized with a random distribution.

Interdie variations are the variations from die to die, and affect all the devices on the same chip in the same way. For example, interdie variations may result in all transistor gate lengths of circuit devices on the same chip being larger or all transistor gate lengths of circuit devices on the same chip being smaller.

Intradie variations correspond to variability within a single chip, and may affect different devices on the same chip differently. For example, intradie variations may be the result of some circuit devices having smaller oxide thicknesses than the nominal, while other circuit devices on the same chip have larger oxide thicknesses.

Interdie variations have been a long-standing design issue, and for several decades, designers have striven to make their circuits robust under the unpredictability of such variations. This has typically been achieved by simulating the design at not just one design point, but at multiple "corners." These corners are chosen to encapsulate the behavior of the circuit under the worst-case variations, and have served designers well in the past. In nanometer technologies, intradie variations have become significant and can no longer be ignored. As a result, a process corner-based methodology, which would simulate the entire chip at a small number of design corners, is no longer sustainable, and such a procedure will be very conservative and pessimistic. For true accuracy, this can be overcome by using a larger number of process corners, but this number may be too large to permit computational efficiency.

Unlike interdie variations, whose effects can be captured by a small number of STA runs at the process corners, a more sophisticated approach is called for in dealing with intradie variations. Traditional STA techniques are limited by their deterministic nature. An alternative approach that overcomes these problems is SSTA. SSTA treats delays not as fixed numbers, but as probability density functions (PDFs) or cumulative density functions (CDFs), taking the statistical distribution of parametric variations into consideration while analyzing the circuit.

Random variations (as the name implies) depict random behavior that can be characterized in terms of a distribution. This distribution may either be explicit, in terms of a large number of samples provided from fabrication line measurements, or implicit, in terms of a known PDF (such as a Gaussian or a lognormal distribution) that has been fitted to the measurements.

Random variations in some process or environmental parameters (such as the temperature, supply voltage, or effective channel length) can often show some degree of local spatial correlation, whereby variations in one transistor in a chip are remarkably similar in nature to those in spatially neighboring transistors, but may differ significantly from those that are far away. Other process parameters (such as oxide thickness and dopant concentration) do not show much spatial correlation at all, so that for all practical purposes variations in neighboring transistors are uncorrelated.

Systematic variations show predictable variation trends across a chip, and are caused by known physical phenomena during manufacturing. Strictly speaking, environmental changes are entirely predictable, but practically, due to the fact that these may change under a large number (potentially exponential in the number of inputs and internal states) of operating modes of a circuit, it is easier to capture them in terms of random variations. Examples of systematic variations include those due to spatial intrachip gate length variability, which observes systematic changes in the value of L a across a reticle due to effects such as changes in the stepper-induced illumination and imaging non-uniformity due to lens aberrations, or ILD variations, due to the effects of chemical-mechanical polishing (CMP) on metal density patterns.

The existence of correlations between intradie variations complicates the task of statistical analysis. There are spatial correlations and structural correlations.

Spatial correlations are used to model the intradie spatial correlations of parameters. Thus, one type of model, a die region may be divided up (tessellated) into n grids. Since devices or wires close to each other are more likely to have similar characteristics than those placed far away, it is reasonable to assume perfect correlation among the devices (wires) in the same grid, high correlation among those in close grids and low or zero correlation in far-away grids. Under this model, a parameter variation in a single grid at location (x, y) can be modeled using a single random variable $p(x, y)$. For each type of parameter, n random variables are needed, each representing the value of a parameter in one of the n grids.

Structural correlations are those in the structure of the circuit that lead to correlations and should be incorporated into SSTA. For example, a data path may split and then re-converge at a later point. The maximum delay of a circuit may depend upon which path has the greater delay. Thus, with respect to an SSTA delay calculation, there is a correlation in the structure of the circuit.

While SSTA delay calculations take into account process variations, a full SSTA flow takes time to setup/integrate for all timing paths on a chip, as this is a new technology and not widely adopted yet. The results from a full SSTA flow are also complicated to understand as designers are not yet experienced with the new technology and so an interim method, DS-OCV can be utilized accounting for process variations.

For reusable IP circuit blocks (also referred to as reusable IP cores), the IC design industry typically uses a black box model for description of the circuit behavior. That is, the input and output interfaces to the IP circuit block are defined but no further information regarding the internal portions of the circuit can be inferred there-from. Black box models have limitations such as lack of preserving clock independent latch behavior, a possible blow up of model size, and limited assertion/constraint support. To avoid some of the drawbacks and limitations with black box models, grey box models are becoming more popular to use in defining IP circuit blocks in the IC design industry.

A statistical timing model of a circuit block can be a black box model or a grey box model. For grey box models, additional pins are also preserved, such as common clock path pessimism points.

Timing Analysis for on-Chip-Variation

Timing analysis for on-chip-variation has been employed for static timing analysis to try to take into account within-die process variation. The de-rating factor used for on-chip variations is usually provided by the fabrication facility to match their processes. The OCV de-rating factor provided by the fabrication facility is a constant that is used for all integrated circuit designs for a given fabrication process. However, the effect of process variation on circuit timing may be design dependent. That is, within-die variations may be design-specific due to the circuit methodology and topology deployed and may have unique sensitivities to fabrication process variations.

One or more embodiments of the invention calculate a de-rating factor (referred to as a design-specific on-chip variation de-rating factor) to use to account for on-chip variation that is design specific, variation-aware. The design-specific on-chip variation (DS-OCV) de-rating factor is then applied to a traditional on-chip variation design flow to prevent overly pessimistic or overly optimistic results that might have otherwise have been determined with an on-chip variation de-rating factor that was not design specific, but constant across all designs.

The embodiments of the invention use a statistical static timing analysis (SSTA) method that is accurate in timing analysis with process variations to derive the DS-OCV de-rating factors. The results of a static timing analysis (STA) using the DS-OCV de-rating factors are found to be closer to the actual timing results of the fabricated integrated circuits.

SSTA results take into account process variations though it is a relatively new technology and a full SSTA flow takes time to integrate into existing design flows. The invention applied to OCV is also an intermediate solution before SSTA methodology gets fully adopted while providing a better and more accurate solution than traditional OCV.

The factor calculated from DS-OCV can also be applied to any OCV-aware timing flow. For example, when it is applied to an OCV-aware timing optimization flow to correctly consider the effect of process variation, without over-optimizing the design and with good timing yield, die pass the timing check limits during testing.

Herein a method to minimize run time while maintaining an acceptable level of accuracy is described that utilizes a statistical static timing analyzer, de-rating factor provide by the fabrication facility for OCV and characterization of the circuits based on corner models to calculate a design-specific on chip variation (DS-OCV) de-rating factor. The DS-OCV de-rating factor that may be used with the fabrication facility OCV de-rating factor to improve timing accuracy.

Methods of Calculating DS-OCV De-Rating Factors

Figure 1B:
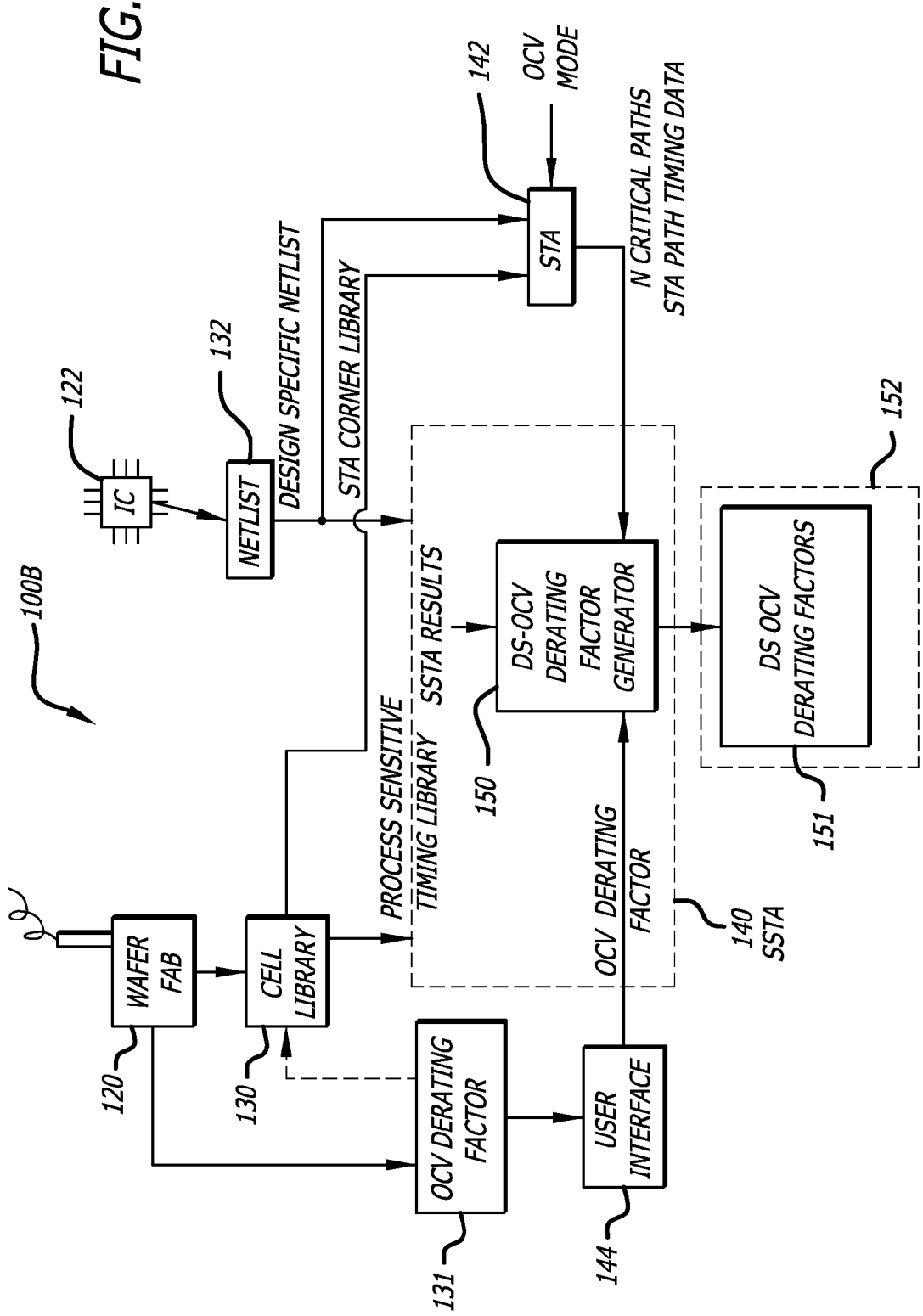
FIG. 1B is a block diagram illustrating a system of input and output files and software modules executable by a computer that may be used to calculate the design specific on chip variation (DS-OCV) de-rating factors.

Reference is now made to FIGS. 1A-1B. FIG. 1A illustrates a flow chart diagram to describe a method of calculating design specific on chip variation (DS-OCV) de-rating factors. FIG. 1B illustrates a system 100B of input and output files and software modules executable by a computer (e.g., computer system 400 shown in FIG. 4) that may be used to calculate design specific on chip variation (DS-OCV) de-rating factors. The system 100B includes a statistical static timing analysis software tool 140 in communication with a static timing analysis software tool 142. The statistical static timing analysis software tool 140 may include a DS-OCV de-rating factor generator 150 to perform the calculations to generate the DS-OCV de-rating factors in response to information from the cell library 130 and timing results along the same one or more paths from both a static timing analysis provided by the STA tool 142 and a statistical static timing analysis performed by the SSTA tool 140.

A wafer fabricator or manufacturer 120 may provide the cell library 130 with static timing analysis information, such as worst case process corner and best case process corners forming a process corner library that may contain process specific timing information for circuitry that may be used in designing an IC, and one or more general on-chip variation factors shown in 131 which are not design specific. Cell library 130 may be used for all IC designs for a given process as it has been specifically characterized using unique process technology models in determining the timing performance of each cell. This differs from the Design-Specific OCV library that has been in that the latter has. The library used for SSTA simulations includes a characterized nominal library with process sensitivities.

The OCV de-rating factor 131 received from the wafer fab 120 may also be an input to the SSTA through the user interface 144. Optionally, the OCV de-rating factor may be located in the cell library 130. The optional design-specific library 152 may include the DS-OCV de-rating factors. The input to a SSTA tool may also involve PDF and CDF distribution information that define the distribution of all varying process parameters.

The design of an integrated circuit 122, or a portion thereof to be analyzed, is represented by a design specific netlist 132 that represents the desired logical function. The netlist 132 describes the logic circuits and their interconnection in a standard format using text that computer software can read. Generally, a static timing analysis is performed to determine if the netlist 132 meets the desired performance requirements set for the integrated circuit 122 before it is manufactured in a semiconductor substrate.

The STA in OCV mode tool 142 may be run on one or more paths within the netlist 132. The STA in OCV output data may be then used in determining the DS-OCV de-rating factors. Alternatively, a user (e.g., IC designer) may select one or more paths within the netlist 132 that are used to generate the DS-OCV de-rating factors. Regardless, the STA software tool 142 performs a static timing analysis over these one or more paths to generate timing results for each. The SSTA software tool 140 in response to the probability information in the cell library and user selected yield of IC design, is executed to generate timing results for each of the same one or more paths.

The DS-OCV de-rating factor generator 150 receives the timing results from each of the STA software tool 142 and the SSTA software tool 140 to perform the calculations to generate the DS-OCV de-rating factor. The DS-OCV de-rating factor generator 150 may also receive the OCV de-rating factor information from the cell library 130 or a given de-rating factor from a user interface 144. In response to the received inputs, the DS-OCV de-rating factor generator 150 generates and outputs the DS-OCV de-rating factor 151. The DS-OCV de-rating factor 151 may optionally be merged with the cell library 130 to form a design specific cell library 152. Regardless, the DS-OCV de-rating factor may be used to perform an improved static timing analysis of the complete netlist 132.

Referring now to FIG. 1A, the method of calculating a data and clock design specific on chip variation (DS-OCV) de-rating factor starts at process block 100A and goes to process block 102.

At process block 102, the STA tool in OCV mode 142 receive a design specific netlist 132, STA process corner cell library 130, and an optionally selected paths or groups of paths that are used to determine DS-OCV de-rating factors as in optional process block 103. The process then goes to process block 108.

At process block 108, a static timing analysis is performed with a general OCV de-rating factor using the process corner library to generate a STA path timing data or results.

At process block 104, N paths may be selected from the netlist 132 or from the optional process block 108, where the user may optionally selected paths or groups of paths, for calculating a design specific on chip variation (DS-OCV) de-rating factor. The N paths may be N critical data paths in the netlist 132 of the circuit. A static timing analysis of the netlist 132 may be performed to determine the N paths or a user may specify path groups to analyze to determine the N paths from the path groups. The process may then proceed and go to process blocks 109 and to process block 106, the SSTA simulator.

At process block 109, the STSA path timing data of N critical paths from process block 104 are received. The process then goes to process block 112 where the timing is evaluated with the timing results from process block 107.

SSTA simulations require the user to select a desired yield in order to calculate the timing analysis and is found in process block 105 that is used in process block 106. At process block 106, a statistical static timing analysis is performed on the N selected paths with a SSTA process sensitive delay library to generate SSTA path timing data or results in response to a selected desired IC yield. At process block 107, the SSTA path timing data or results is received. The process then goes to process block 112.

At process block 112, the DS-OCV de-rating factor generator 151 determines the DS-OCV de-rating factor for capturing (clock) and/or launching (data) paths to compensate for the timing difference between simulating the N paths with an STA or SSTA. As explained further herein, the DS-OCV de-rating factor is used by the STA in OCV mode, software tool 142 to more accurately report timing of the netlist in response to the design specific variations and process variations. After calculation of the DS-OCV de-rating factors, the calculation process may be repeated for other circuits or other selected path within the integrated circuit. Otherwise the calculation process may end with process block 199.

Figure 2A:
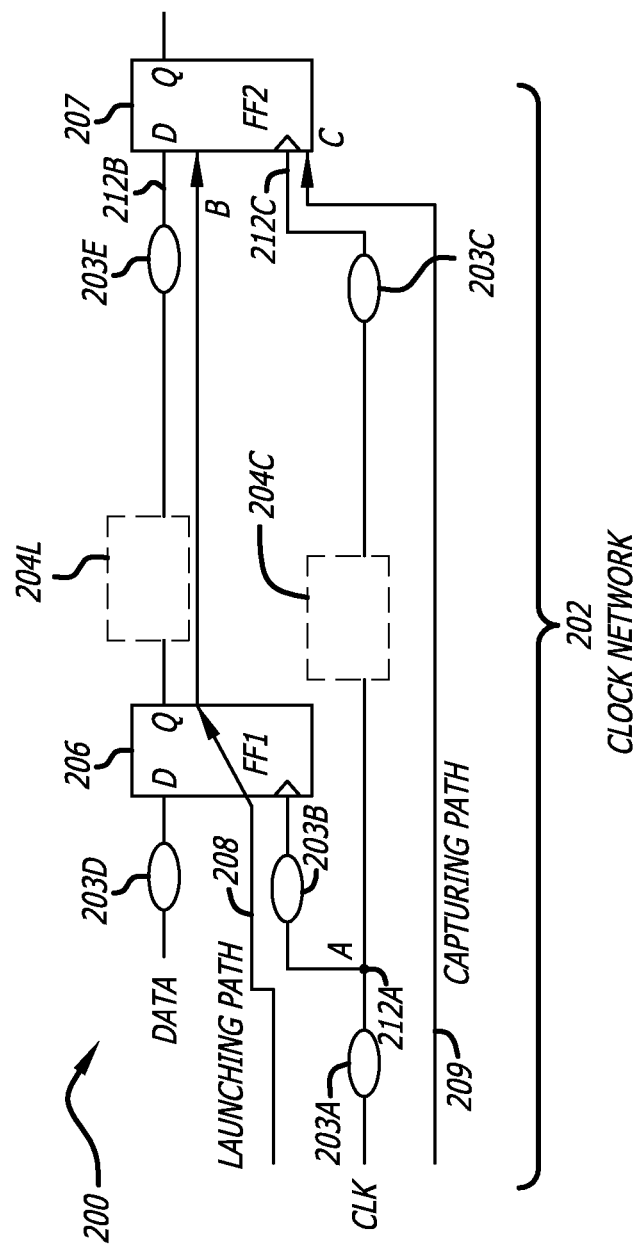
FIG. 2A illustrates a block diagram of a synchronous circuit with an exemplary data path from which a design specific on-chip variation de-rating factor may be determined.
Figure 2B:
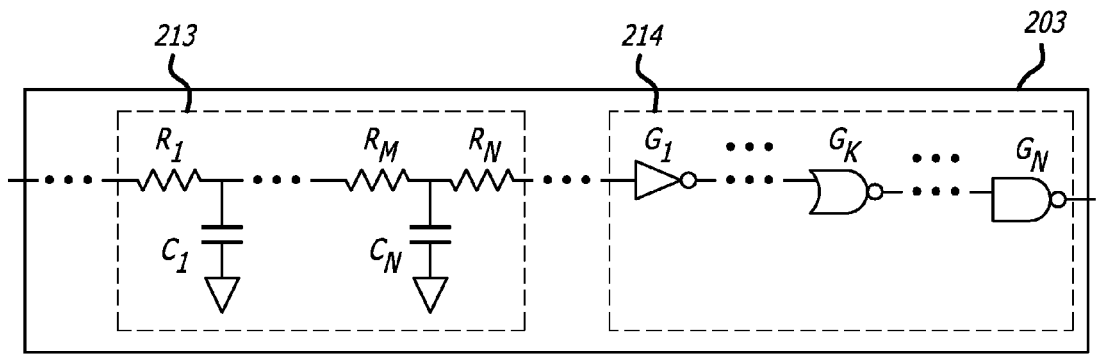
FIG. 2B illustrates a schematic diagram of exemplary interconnect circuits that may be found in the data paths and clock paths of the synchronous circuit illustrated in FIG. 2A.

The function of the DS-OCV de-rating factor generator 150 may be better understood by considering the exemplary circuit illustrated by FIGS. 2A-2B.

Referring now to FIG. 2A, an exemplary circuit 200 may be used to explain the process of calculating a DS-OCV de-rating factor. The circuit 200 includes a first D flip flop 206, a second D flip flop 207, path circuitry 203A-203E, two non de-ratable path circuitry 204C, 204L coupled together as shown in FIG. 2A. A clock signal CLK drives the clock inputs of the flip flops 206-207 over a clock network 202 formed by the path circuitry 203A, 203B, and 203C and the respective interconnect therein including a non de-ratable circuit in capturing path (Other2/Other4) 204C. A data signal DATA may be stored in flip-flop 206 received into its data input over the path circuitry 203D. The data signal may be launched out of the first D flip-flop 206 into the data input of the second D flip flop 207 through interconnect circuitry 203E and non de-ratable circuit in launch path (Other1/Other3) 204L.

Referring now to FIG. 2B, exemplary interconnect circuitry 203 is illustrated that may be an instance of the interconnect circuitry 203A-203E. The interconnect circuitry 203 may include a parasitic interconnect load 213 and logic gate circuitry 214. The parasitic interconnect load 213 may be formed of one or more resistors $R_1$-$R_N$ alternating with one or more capacitors $C_1$-$C_N$. The logic gate circuitry 214 may be formed of one or more logic gates $G_1$-$G_N$ coupled together and/or amongst the load of the resistors $R_1$-$R_N$ and capacitors $C_1$-$C_N$.

A setup mode or a hold mode analysis may be performed on the circuit 200 to determine the DS-OCV de-rating factor. For a setup mode analysis, the circuit 200 includes a launching path 208 and a capture path 209 to calculate timing delays. From joint clock node 212A in the clock network 202, the launching path 208 includes the interconnect circuitry 203B, flip flop 206, and interconnect circuitry 203B, 204L and 203E to node 212B at the data input of the D flip-flop 207. From joint clock node 212A in the clock network 202, the capturing path 209 includes the interconnect circuitry 204C, 203C to node 212C at the clock input of the D flip-flop 207.

While the exemplary circuit illustrated by FIG. 2A is a synchronous circuit with clock and data paths, the DS OCV de-rating factor may also be used for asynchronous circuits having asynchronous data paths with a simple data path delay or arrival time.

Assuming the SSTA and STA analysis of processes 106 and 108 have been performed, the processes 112 to determine the DS OCV de-rating factor for the circuit 200 is now described.

In order to determine the DS OCV de-rating factor, the timing results from the SSTA and STA for the same timing path are evaluated. The difference between the two results would be accounted for in the de-rating factor for that timing path. The DS-OCV de-rating factor takes into account the process variations and then may be used in timing analysis of all circuits on the chip or selected subset of paths or groups of paths of the chip.

A user can selectively apply the DS-OCV de-rating factor to groups of similar circuits, or one circuit through the user interface 144 shown in FIG. 1B.

The exemplary synchronous circuit shown in FIG. 2A is now utilized to describe the equations to calculate the DS-OCV de-rating factor for both a setup mode (associated with setup time) and a hold mode (associated with hold time) of the circuit. Separate de-rating factors may be determined for similar circuits and or groups of circuits at the discretion of the user through the user interface 144. Separate de-rating factors may also be determined for setup and hold modes of a circuit. In one case, the setup mode of a synchronous circuit may be used to determine the DS-OCV de-rating factor. In another case, the hold mode of a synchronous circuit may be used to determine the DS-OCV de-rating factor as it may differ from that determined for the setup mode. It should be noted that asynchronous circuits may also have a de-rating factor and evaluated in a similar method with both STA and SSTA timing results.

Referring now to FIG. 2A, setup and hold times are timing characteristics typically associated with the D flip-flops 206, 207 in response to a rising or falling edge (a transition) of a clock signal CLK. The edge of the clock signal CLK may determine what data signal appears at the output Q of the D flip flop.

The setup time is the time a signal needs to arrive into the Data input of a D-flip flop before the clock signal changes state (e.g., rising edge from logic zero to logic one or falling edge from logic high to logic zero) in order to for the data to appear at the output on the next clock edge. Hold time is the time that the signal must remain unchanged when the clock changes state (e.g., rising edge from logic 0 to logic 1, or falling edge from logic 1 to logic 0) in order for the data to be seen at the output on the next clock edge.

In deriving the DS-OCV de-rating factor for setup times, the circuit path under review may be stimulated appropriately for a setup time analysis to be performed.

Referring to FIG. 2A, let a first slack, Slack1, be the slack time of the critical path calculated using STA in OCV mode with a process corner characterized library. Furthermore, let the latest arrival time AT1 be designated by the launching path 208 and let the earliest required time RT1 be designated by the capturing path 209. The calculation of the first slack Slack1 is determined by subtracting the latest arrival time AT1 from the earliest required time RT1 as described in equation 1 as follows:

$$\text{Slack1}=\text{RT1}-\text{AT1} \qquad \text{(setup)(Equation 1)}$$

The latest arrival time AT1 is determined along the launching path 208. A de-ratable delay portion (Delay_A_B) of the delay path along the launching path is the delay from joint node 212A to node 212B including the time delays from the interconnect circuitry 203B, 203E and the internal delay of the first D flip flop FF1 206. There may be some other delay in the path that the user deems to be not de-ratable by the DS-OCV de-rating factor, 204L. The non-de-ratable delay portion of the launching path is accounted for by a variable, a first non-de-ratable delay portion denoted by Other1 (FIG. 2A 204L). The latest arrival time AT1 may be computed by summing together the de-ratable delay portion of the launching path and the first non-de-ratable delay portion of the launching path as shown in equation 2 as follows:

$$\text{AT1}=\text{Delay}\_A\_B+\text{Other1} \qquad \text{(setup)(Equation 2)}$$

The de-ratable delay portion Delay_A_B is the delay from joint node 212A of the path to node 212B at the data input to the second D flip-flop 207. The non-de-ratable delay portion Other1 (FIG. 2A 204L) is the other causes of time delay in the path from node 212A to node 212B and timing constraints on the path that are not to be de-rated by the DS-OCV.

The first required time RT1 is determined along the capturing path 209. A de-ratable delay portion (Delay_A_C) of the delay path along the capturing path is the delay from joint node 212A to node 212C at the clock input of the second flip flop 207, including the delay from the interconnect circuitry 203C. There may be some delay in the path that the user deems to be non de-ratable by the DS-OSV de-rating factor. The non-de-ratable delay portion of the capturing path is accounted for by the variable, a second non-de-ratable delay portion denoted by Other2 (FIG. 2A 204C). The first required time RT1 may be computed by summing together the de-ratable delay portion of the capturing path and the second non-de-ratable delay portion of the capturing path as shown in equation 3 as follows:

$$\text{RT1}=\text{Delay}\_A\_C+\text{Other2} \qquad \text{(setup)(Equation 3)}$$

The de-ratable delay portion Delay_A_C in the capturing path is the delay from the joint node 212A of both paths to node 212C at the clock input to the second flip flop FF2 207. The non-de-ratable delay portion in the capturing path, Other2 (FIG. 2A 204C), is the other causes of time delays in the path to node 212C at the clock input of the second flip flop 207 and timing constraints that are not to be de-rated by the DS-OCV de-rating factor.

A similar analysis with similar equations may be used for the SSTA simulation. Let a second slack time, Slack2 be the slack time of the same path previously used to determine the first slack, Slack1 but now with a SSTA analysis. Slack time in a SSTA analysis is the slack value to meet a specific percentile yield value, e.g., mean−3*sigma value of the slack for 99.9% yield. The process variations are accounted for through statistical modeling of the process and the yield of good die.

To correctly take into account the process variation effect on timing in STA in OCV mode analysis, Slack1 should be de-rated by DS-OCV factor to be equal to the value of the SSTA slack, Slack2. To make them equal, we calculate the design specific on-chip variation de-rating factor value that can be used in an STA OCV analysis so that STA slack, Slack1 is equivalent to SSTA slack, Slack2. Let alpha and beta be the DS-OCV de-rating factors to use in the launch (data) and capture (clock) path respectively. The equation for Slack2 becomes equation 4 as follows:

$$\text{Slack2}=\text{Slack1}=\text{alpha}*\text{RT1}-\text{beta}*\text{AT1} \qquad \text{(setup)(Equation 4)}$$

Solving for beta on each designated path and recording the minimum and maximum values for beta. This provides the user a range to determine the appropriate, a value for conservative slack values of N paths, beta value to be used as an input parameter to STA in OCV mode analysis. Other1 and Other2 are non de-ratable parts of the delay path and therefore not modified by alpha and beta $$\text{Slack2}=(\text{alpha}*\text{Delay}\_A\_C+\text{Other2})-(\text{beta}*\text{Delay}\_A\_B+\text{Other1}) \qquad \text{(setup)(Equation 5)}$$

Solving the equation for beta:

$$\text{beta} = \frac{1}{\text{Delay\_A\_B}}[(\text{alpha}*\text{Delay\_A\_C} + \text{Other2}) - \text{Slack2} - \text{Other1}] \qquad \text{(setup)(Equation 6)}$$

or conversely solving for alpha:

$$\text{alpha} = \frac{1}{\text{Delay\_A\_C}}[\text{Slack2} + (\text{beta}*\text{Delay\_A\_B} + \text{Other1}) - \text{Other2}] \qquad \text{(setup)(Equation 7)}$$

One of the DS-OCV de-rating factors, either alpha or beta is a given value. The value may be provided by the user or received from the fabrication and manufacturing facility. For example, the given value for one of the DS-OCV de-rating factors may be a general OCV de-rating factor value that is typically applied to all circuits manufactured in a given process. The general OCV de-rating factor value may be part of a standard cell library for a given semiconductor manufacturing process.

In a STA DS-OCV timing analysis, the user may provide a de-rating factor (alpha) for the capturing path; the other de-rating factor (beta) can be computed by equation 6 for the same specific path. Alternatively, if the user provides a de-rating factor for the launching path (beta), the other de-rating value (alpha) can be computed with equation 7.

In deriving the DS-OCV de-rating factor for a hold time mode, the circuit path under review may be stimulated appropriately for a hold time mode analysis to be performed. In hold mode analysis, slack Slack3 is determined by subtracting the latest required time RT3 from the earliest arrival time AT3 as indicated by Equation 8 as follows:

$$\text{Slack3}=\text{AT3}-\text{RT3} \qquad \text{(hold)(Equation 8)}$$

The earliest arrival time AT3 is determined along the launching path 208. A de-ratable delay portion (Delay_A_B) of the delay path along the launching path is the delay from joint clock node 212A to node 212B, including the time delays from the interconnect circuitry 203B, 203E and the internal delay of the first D flip flop FF1 206. There may be some other delay in the path that the user deems to be not de-ratable by the DS-OCV de-rating factor. The non-de-ratable delay portion of the launching path is accounted for by the variable, the first non-de-ratable delay portion denoted by Other3 (FIG. 2A 204L). The first arrival time AT3 may be computed by summing together the de-ratable delay portion (Delay_A_B) of the launching path and the first non-de-ratable delay portion (Other3) of the launching path as shown in equation 9 as follows:

$$AT3 = Delay\_A\_B + Other3 \quad \text{(hold)(Equation 9)}$$

The de-ratable delay portion Delay_A_B is the delay from joint clock node 212A of the path to the data input node 212B at the data input to the second D flip flop 207. The non-de-ratable delay portion Other3 is the other causes of time delay in the path from the joint clock node 212A to the data input node 212B that are not to be de-rated by the DS-OCV.

The latest required time RT3 is determined along the capturing path 209. A de-ratable delay portion (Delay_A_C) of the delay path along the capturing path is the delay from joint clock node 212A to the clock input node 212C at the clock input of the second flip flop 207, including the delay from the interconnect circuitry 203C. There may be some delay in the path that the user deems non de-ratable by the DS-OSV de-rating factor. The non-de-ratable delay portion of the capturing path is accounted for by the variable, the second non-de-ratable delay portion denoted by Other4. The latest required time RT3 may be computed by summing together the de-ratable delay portion (Delay_A_C) of the capturing path and the second non-de-ratable delay portion (Other4) of the capturing path as shown in equation 10 as follows:

$$RT3 = Delay\_A\_C + Other4 \quad \text{(hold)(Equation 10)}$$

The de-ratable delay portion Delay_A_C in the capturing path is the delay from the joint clock node 212A of both paths to the clock input node 212C at the clock input to the second flip flop FF2 207. The non-de-ratable delay portion in the capturing path, Other4, is the other causes of time delays in the path to the clock input node 212C at the clock input of the second flip flop 207 that are not to be de-rated by the DS-OCV de-rating factor.

A similar analysis with similar equations may be used for the SSTA simulation. Let the variable Slack4 be the slack time of the same path previously used for determining the variable Slack3 but now with a SSTA analysis. As noted previously, slack time in SSTA analysis is the slack value to meet a specific percentile yield value, e.g. mean−3*sigma value of the slack for 99.9% yield. The process variations are accounted for through statistical modeling of the process and the yield of good die.

To correctly take into account the process variation effect on timing in STA or STA OCV analysis, the computed STA slack Slack3 should be equal to the value of the computed SSTA slack, Slack4, but it does not. To make them equal, we calculate the design specific on-chip variation de-rating factor value that can be used in an STA OCV analysis so that the STA slack Slack3 is equivalent to the SSTA slack Slack4. Thus setting the slack variables of Slack3 and Slack4 to be equal with de-rating factors added to the computation, we can derive equation 11 as follows:

$$Slack4 = Slack3 = (beta*AT3) - (alpha*RT3) \quad \text{(hold)(Equation 11)}$$

Solving for the DS-OCV de-rating factor beta for each designated path of N paths, N values for the de-rating factor beta may be found. This provides the user a range (including minimum and maximum values) to determine an appropriate value for beta to be stored in a process corner cell library for DS-OCV STA analysis.

Let alpha and beta be the de-rating factors to use in data and clock path respectively.

The equation for the slack in the path Slack4 becomes equation 12 as follows:

$$Slack4 = (beta*Delay\_A\_B + Other3) - (alpha*Delay\_A\_C + Other4) \quad \text{(hold)(Equation 12)}$$

Solving the equation for beta:

$$beta = \frac{1}{Delay\_A\_B}[Slack4 + (alpha*Delay\_A\_C + Other4) - Other3] \quad \text{(hold)(Equation 13)}$$

or conversely solving for alpha:

$$alpha = \frac{1}{Delay\_A\_C}[(beta*Delay\_A\_B + Other3) - Slack4 - Other4] \quad \text{(hold)(Equation 14)}$$

One of the alpha or beta de-rating factors is a given value from either the user or from the fabrication and manufacturing facility. In a STA OCV timing analysis, the user may provide a de-rating factor (alpha) for the capturing path, the other de-rating factor (beta), the DS-OCV de-rating factor, can be computed by equation 13 for the same specific path. Alternatively, if the user provides a de-rating factor for the launching path, (beta), the value of the other DS-OCV de-rating factor (alpha) can be computed with equation 14.

Figure 3A:
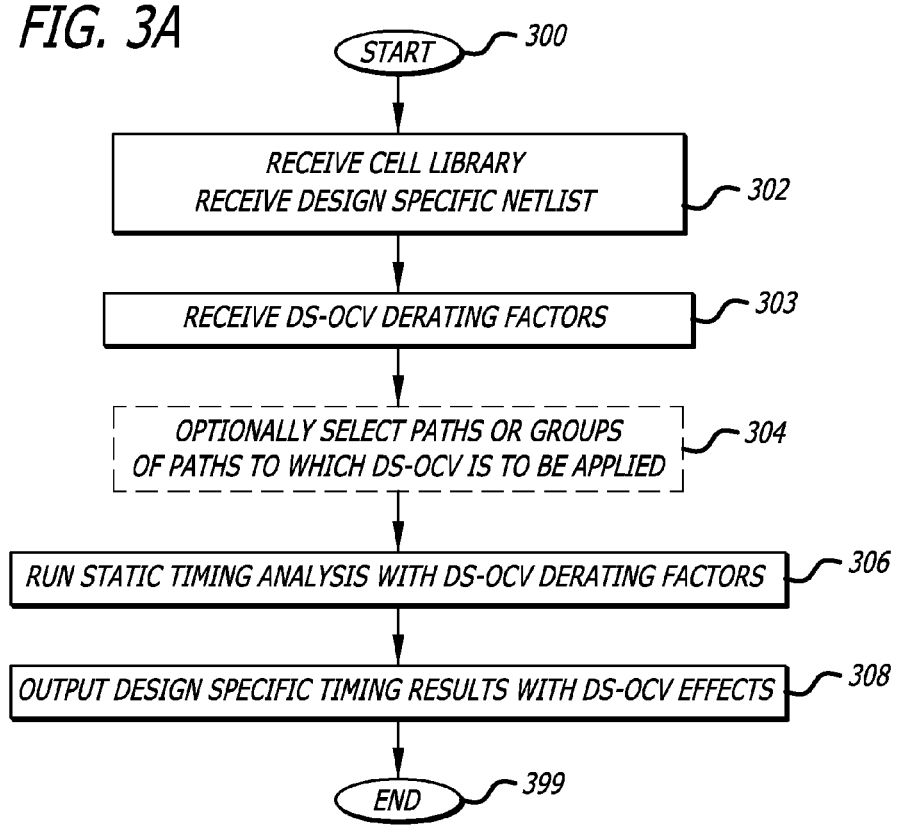
FIG. 3A is a flow chart diagram illustrating a method of statistical timing analysis of a circuit design with the design specific on chip variation (DS-OCV) de-rating factors calculated by the method illustrated in FIG. 1A.
Figure 3B:
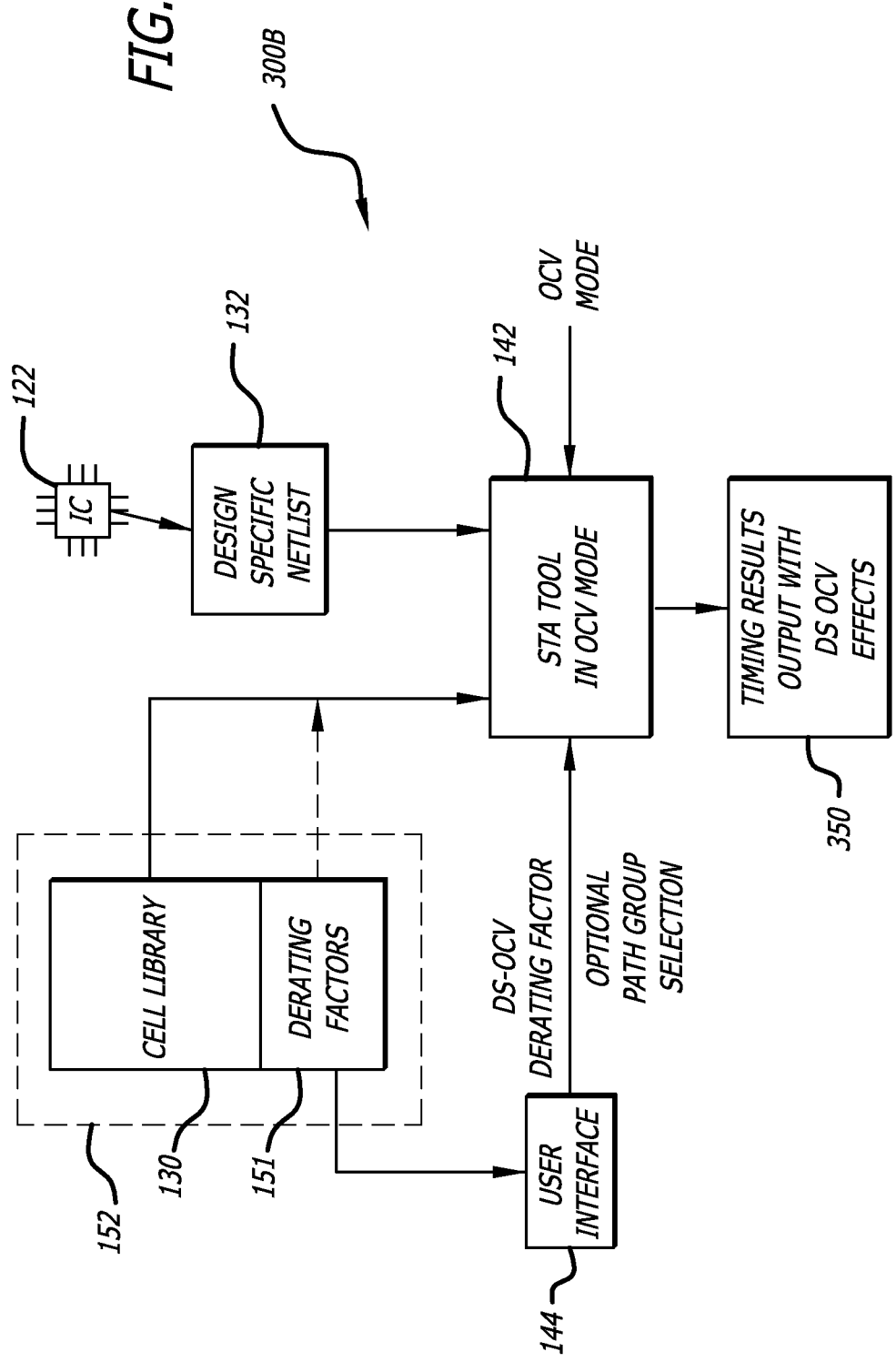
FIG. 3B is a block diagram illustrating a system of input and output files and software modules executable by a computer that may be used to perform static timing analysis of an integrated circuit design with the design specific on chip variation (DS-OCV) de-rating factors.

Reference is now made to FIGS. 3A-3B. FIG. 3A illustrates a flow chart diagram to describe how DS-OCV de-rating factors are used in static timing analysis flow. FIG. 3B illustrates a system 300B of input and output files along with software modules executable by a computer (e.g. computer system 400 shown in FIG. 4.) that may be used to calculate the data and clock design specific on chip variations (DS-OCV) de-rating factor. The system 300B includes a static timing analysis software tool 142 with a user interface 144.

The STA tool 142 may be used to determine one or more paths within the netlist 132 that may be used to generate the DS-OCV de-rating factors. Alternatively, a user (e.g., IC designer) may select the one or more paths within the netlist 132 that are used to generate the DS-OCV de-rating factors or through the user interface 144. Regardless, the STA software tool 142 performs a static timing analysis over these one or more paths to generate timing results for each.

The design of an integrated circuit 122, or a portion thereof for analysis, is represented by a design specific netlist 132 that represents the desired logical function. The netlist 132 describes the logic circuits and their interconnection in a standard format with text that computer software can read. Generally, a static timing analysis is performed to determine if the netlist 132 meets the desired performance requirements set for the integrated circuit 122 before it is manufactured in a semiconductor substrate.

The user interface 144 controls the STA in OCV mode in terms of input and output files, and may determines the optional path group selection, the ability to input the OCV de-rating factor, circuit simulation environment conditions such as temperature, voltage, input pin driving conditions and loading on the circuit outputs pins e.g. FIG. 2B.

The output of the STA in OCV mode 142 is the Timing Results with DS-OCV 350 effects accounted for and to be analyzed by the IC design engineer to validate the design objective. This output may be computer readable format such that an analysis tool may interpret the results in a graphical format as well as human readable depending on the output selection mode through the user interface 144.

Static Timing Analysis with DS-OCV De-Rating Factors

Referring to FIG. 3A, a process of using DS-OCV de-rating factors is illustrated that begins with process block 300 and goes to process block 302.

At Process block 302 the STA with OCV receives the design specific netlist 132 and the STA corner library 130. The design specific netlist 302 includes circuits that will be analyzed as to those paths or groups of paths to apply the DS-OCV de-rating factor(s) The process then proceeds to process block 303

At process block 303 the DS-OCV de-rating factors are received and then optionally proceeds to 304 or continues on to process block 306.

At optional process block 304 the user may select through the user interface 144 of the STA tools in OCV mode 142 the path or path(s) or groups of paths to apply the DS-OCV de-rating factor to. Alternatively the user may select to apply the DS-OCV de-rating factor to all paths of the design if no path groups are specified from the user interface 144. The process then proceeds to process block 306.

At process block 306 the STA in OCV mode 142 with DS-OCV de-rating factors and cell library 152 as an input, executes on the design specific netlist 132. Equation 15 below is an example of how this would be implemented in the timing description language in the process corner cell library and will be different depending on the software coding language utilized and does not represent any specific code and is provided only as to illustrate how the de-rating factor may be utilized.

$$\text{Clock-early\_beta}_{max}\text{clock-late} 1.0 \quad \text{(setup)(Equation 15)}$$

Equation 16 below is an example of how this may be implemented in the timing description language for the process corner cell library. Note that this description does not represent any specific code and is provided only as to illustrate how the de-rating factor may be utilized. One will recognize that the description will differ depending upon the software coding language utilized.

$$\text{Clock-late\_alpha}_{min}\text{clock-early} 1.0 \quad \text{(hold)(Equation 16)}$$

After the STA in OCV mode with DS-OCV de-rating factors has been performed the process continues to process block 308.

At process block 308 the output design specific timing results with DS-OCV effects or results 350 are generated. Once the design specific timing data and or results 350 have been completed the process 300 may be repeated for different process corners and or environment conditions such as voltage and temperature otherwise the process will end with process block 399.

In calculating the DS-OCV de-rating factor, a desired yield may be selected by a user in the SSTA analysis. The selected yield for the IC design can alter the timing determined by the SSTA analysis that in turn can alter the DS-OCV de-rating factor. For example if a lower yield is acceptable, the DS-OCV de-rating factor may be calculated for a lower yield and provide a timing analysis to allow for a more aggressive circuit design. If a higher yield is required, the DS-OCV de-rating factor may be calculated for a higher yield and provide a timing analysis of a more conservative circuit design.

Computer System

Figure 4:
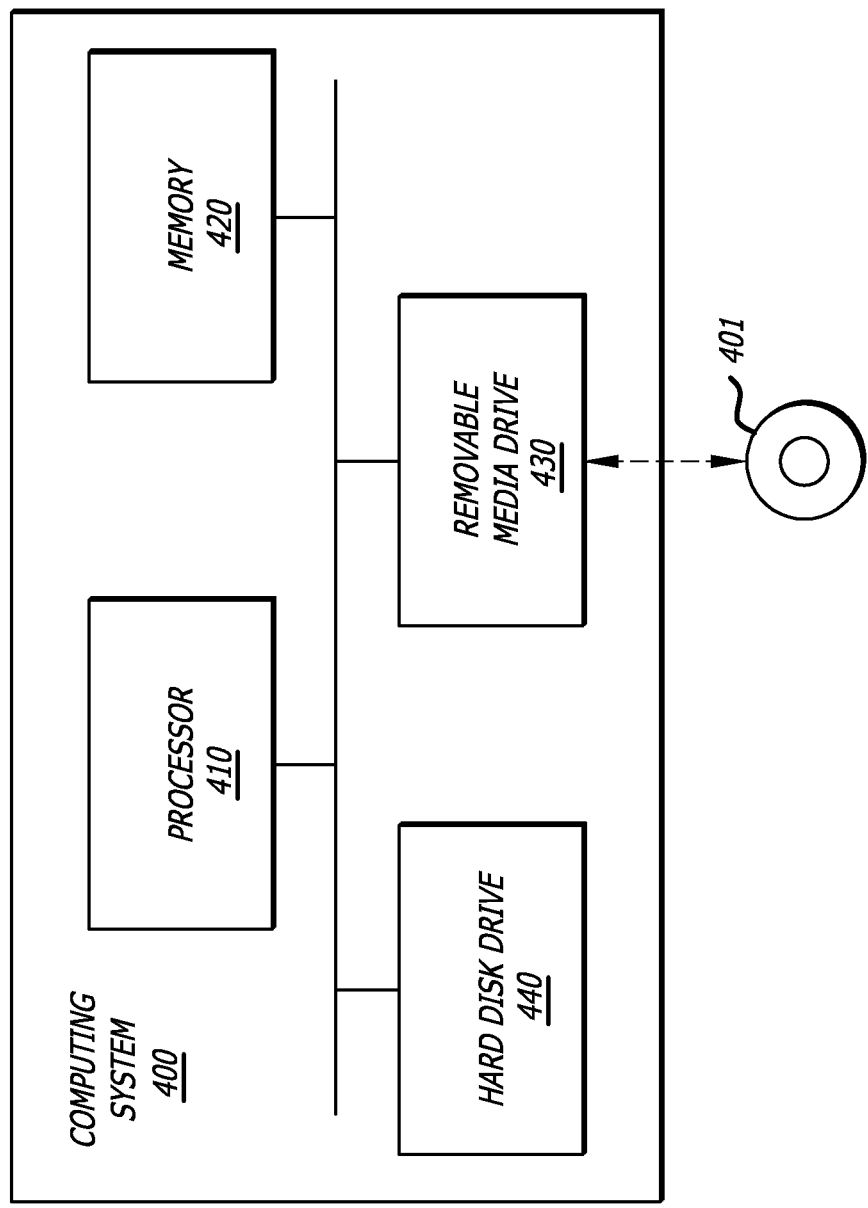
FIG. 4 illustrates a computing system that may be used to perform some or all of the processes in accordance with several of the embodiments of the invention.

Referring now to FIG. 4, a computing system 400 is illustrated that may be used to perform some or all of the processes in accordance with a number of embodiments of the invention. In one embodiment of the invention, the computing system 400 includes a processor 410, a memory 420, a removable media drive 430, and a hard disk drive 440. In one embodiment, the processor 410 executes instructions residing on a machine-readable medium, such as the hard disk drive 440, a removable medium 401 (e.g., an optical medium (compact disk (CD), digital videodisk (DVD), etc.), a magnetic medium (magnetic disk, a magnetic tape, etc.), or a combination of both. The instructions may be loaded from the machine-readable medium into the memory 420, which may include Random Access Memory (RAM), dynamic RAM (DRAM), etc. The processor 410 may retrieve the instructions from the memory 420 and execute the instructions to perform the operations described above.

Note that any or all of the components and the associated hardware illustrated in FIG. 4 may be used in various embodiments of the system 400. However, it should be appreciated that other configurations of the system 400 may include more or less devices than those shown in FIG. 4.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, magnetic, or other type of storage device.

CONCLUSION

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A method of analysis of a circuit design, the method comprising:
    receiving a netlist of an integrated circuit design having a plurality of data paths;
    receiving a process corner library;
    receiving a first design-specific on-chip-variation (DS-OCV) de-rating factor associated with all logic gate circuitry of the netlist of the integrated circuit design, wherein the first design-specific on chip variation de-rating factor accounts for first process variations that are design specific to the netlist of the integrated circuit design, wherein the first design-specific on-chip-variation de-rating factor is determined by at least comparing timing results of a static timing analysis and timing results of a statistical static timing analysis of at least one data path of the plurality of data paths;
    with a processor, performing a static timing analysis of the entire netlist or portions thereof in response to the process corner library and the first design-specific on chip variation de-rating factor, wherein the static timing analysis generates design specific timing results of the netlist accounting for design-specific on-chip-variation; and
    outputting the design specific timing results associated with the first design-specific on-chip-variation (DS-OCV) de-rating factor.

2. The method of claim 1, wherein
    a static timing analysis tool in an on-chip variation mode performs the static timing analysis of the netlist.

3. The method of claim 1, further comprising:
    prior to static timing analysis, receiving a selection of a subset of paths in the integrated circuit design upon which the static timing analysis is to be performed.

4. The method of claim 3, wherein
    the subset of paths is a group of a plurality of paths associated with the first design specific on-chip variation de-rating factor.

5. The method of claim 1, further comprising:
    determining a second design-specific on-chip-variation (DS-OCV) de-rating factor associated with all logic gate circuitry of the netlist of the integrated circuit design, wherein the second design-specific on chip variation de-rating factor differs from the first design-specific on chip variation de-rating factor and accounts for second process variations that are design specific to the netlist of the integrated circuit design;
    with the processor, performing a static timing analysis of the entire netlist or portions thereof in response to the process corner library and the second design-specific on chip variation de-rating factor; and
    outputting the design specific timing results associated with the second design-specific on-chip-variation (DS-OCV) de-rating factor.

6. The method of claim 5, wherein
    the second design-specific on chip variation de-rating factor is determined by
        comparing timing results of a static timing analysis and timing results of a statistical static timing analysis of the same one or more paths, and
        determining a value that adjusts the static timing analysis to generate design specific timing results that are substantially equivalent to the timing results of the statistical static timing analysis.

7. A method of analysis of a circuit design, the method comprising:
    receiving a netlist of an integrated circuit design having a plurality of data paths;
    receiving a process corner library;
    receiving one or more design-specific on-chip-variation (DS-OCV) de-rating factors associated with the netlist of the integrated circuit design, wherein the one or more design-specific on chip variation de-rating factors account for process variations that are design specific to the netlist of the integrated circuit design and at least one of the one or more design-specific on chip variation de-rating factors is determined by
        comparing timing results of a static timing analysis and timing results of a statistical static timing analysis of the same one or more paths, and
        determining a value that adjusts the static timing analysis to generate design specific timing results that are substantially equivalent to the timing results of the statistical static timing analysis;
    with a processor, performing a static timing analysis of the netlist in response to the process corner library and the one or more design-specific on chip variation de-rating factors, wherein the static timing analysis generates design specific timing results of the netlist accounting for design-specific on-chip-variation; and
    outputting the design specific timing results.

8. The method of claim 7, wherein
    at least one of the one or more design-specific on chip variation de-rating factors is a capturing path design-specific on chip variation de-rating factor, and at least another one of the design-specific on chip variation de-rating factors is a launching path design-specific on chip variation de-rating factor.

9. The method of claim 8, wherein
a value of the capturing path design-specific on chip variation de-rating factor is given, and
a value of the launching path design-specific on chip variation de-rating factor is determined.

10. The method of claim 8, wherein
a value of the launching path design-specific on chip variation de-rating factor is given, and
a value of the capturing path design-specific on chip variation de-rating factor is determined.

11. A system for timing analysis of an integrated circuit design, the system comprising:
a processor to execute instructions; and
instructions stored in a storage device that when executed by the processor provide
a static timing analyzer to statically analyze timing of signal paths in a design specific netlist of an integrated circuit design in response to timing information of a cell library;
a statistical static timing analyzer to statistically analyze timing of the signal paths in the design specific netlist in response to the timing information of the cell library and a desired average yield of the integrated circuit design; and
a design specific on-chip-variation (DS-OCV) de-rating factor generator in communication with the static timing analyzer and the statistical static timing analyzer, the DS-OCV de-rating factor generator to determine one or more DS-OCV de-rating factors to adjust the static timing analyzer to generate design specific timing results for the signal paths that are substantially equivalent to the timing results from the statistical static timing analyzer for the signal paths.

12. The system of claim 11, wherein
the instructions stored in the storage device that when executed by the processor further provide
a user interface to receive a selection of a subset of signal paths in the design specific netlist for which the static timing analyzer statically analyzes timing and the statistical static timing analyzer statistically analyzes timing.

13. The system of claim 11, wherein
the design-specific on chip variation de-rating factor generator determines at least one design-specific on chip variation de-rating factor in response to a given de-rating factor.

14. The system of claim 13, wherein
the given de-rating factor is a general on-chip variation (OCV) de-rating factor for data paths in a given semiconductor manufacturing process, and
the at least one design-specific on chip variation de-rating factor that is determined is a capturing path design-specific on chip variation de-rating factor.

15. The system of claim 13, wherein
the given de-rating factor is a general on-chip variation (OCV) de-rating factor for clock paths in a given semiconductor manufacturing process, and
the at least one design-specific on chip variation de-rating factor that is determined is a launching path design-specific on chip variation de-rating factor.

16. The system of claim 13, wherein
the static timing analyzer further to statically analyze timing of the signal paths in the design specific netlist of the integrated circuit design in response to timing information of the cell library and the one or more design-specific on chip variation de-rating factors to generate design specific timing results for the signal paths.

17. A system for timing analysis of an integrated circuit design, the system comprising:
a processor to execute instructions; and
instructions stored in a storage device that when executed by the processor perform operations including
receiving a netlist of an integrated circuit design having a plurality of data paths;
receiving a process corner library;
receiving a first design-specific on-chip-variation (DS-OCV) de-rating factor associated with all logic gate circuitry of the netlist of the integrated circuit design, wherein the first design-specific on chip variation de-rating factor accounts for first process variations that are design specific to the netlist of the integrated circuit design, wherein the first design-specific on-chip-variation de-rating factor is determined by at least comparing timing results of a static timing analysis and timing results of a statistical static timing analysis of at least one data path of the plurality of data paths;
performing a static timing analysis of the entire netlist or portions thereof in response to the process corner library and the first design-specific on chip variation de-rating factor, wherein the static timing analysis generates design specific timing results of the netlist accounting for design-specific on-chip-variation; and
outputting the design specific timing results.

18. The system of claim 17, further comprising:
the instructions stored in the storage device when executed by the processor further perform operations including
receiving a selection of a subset of paths in the integrated circuit design upon which the static timing analysis is to be performed, wherein the subset of paths is a group of a plurality of paths associated with the first design specific on-chip variation de-rating factor.

19. The system of claim 17, wherein
the first design-specific on chip variation de-rating factor is a capturing path design-specific on chip variation de-rating factor, and
wherein the operations further include receiving a second design-specific on-chip-variation (DS-OCV) de-rating factor associated with all logic gate circuitry of the netlist of the integrated circuit design, wherein the second design-specific on chip variation de-rating factor is a launching path design-specific on chip variation de-rating factor.

20. The system of claim 19, wherein
a value of the capturing path design-specific on chip variation de-rating factor is given, and
a value of the launching path design-specific on chip variation de-rating factor is determined.

21. The system of claim 19, wherein
a value of the launching path design-specific on chip variation de-rating factor is given, and
a value of the capturing path design-specific on chip variation de-rating factor is determined.

22. A system for timing analysis of an integrated circuit design, the system comprising:
a processor to execute instructions; and
instructions stored in a storage device that when executed by the processor perform operations including
receiving a netlist of an integrated circuit design having a plurality of data paths;

receiving a process corner library;

receiving one or more design-specific on-chip-variation (DS-OCV) de-rating factors associated with the netlist of the integrated circuit design, wherein the one or more design-specific on chip variation de-rating factors account for process variations that are design specific to the netlist of the integrated circuit design and are determined by the processor by further performing operations including comparing timing results of a static timing analysis and timing results of a statistical static timing analysis of the same one or more paths, and determining a value that adjusts the static timing analysis to generate design specific timing results that are substantially equivalent to the timing results of the statistical static timing analysis;

performing a static timing analysis of the netlist in response to the process corner library and the one or more design-specific on chip variation de-rating factors, wherein the static timing analysis generates design specific timing results of the netlist accounting for design-specific on-chip-variation; and outputting the design specific timing results.

23. The system of claim 22, further comprising:
the instructions stored in the storage device when executed by the processor further perform operations including
    receiving a selection of a subset of paths in the integrated circuit design upon which the static timing analysis is to be performed, wherein the subset of paths is a group of a plurality of paths associated with a design specific on-chip variation de-rating factor.

24. The system of claim 22, wherein
at least one of the one or more design-specific on chip variation de-rating factors is a capturing path design-specific on chip variation de-rating factor, and
at least another one of the design-specific on chip variation de-rating factors is a launching path design-specific on chip variation de-rating factor.

25. The system of claim 24, wherein
a value of the capturing path design-specific on chip variation de-rating factor is given, and
a value of the launching path design-specific on chip variation de-rating factor is determined.

26. The system of claim 24, wherein
a value of the launching path design-specific on chip variation de-rating factor is given, and
a value of the capturing path design-specific on chip variation de-rating factor is determined.

* * * * *